United States Patent [19]

Wilde et al.

[11] 4,234,922
[45] Nov. 18, 1980

[54] AUTOMATIC LOCOMOTIVE SPEED CONTROL

[75] Inventors: Calvin D. Wilde, Foster City; Daniel L. Turner, Belmont, both of Calif.

[73] Assignee: SAB Harmon Industries, Inc., Grain Valley, Mo.

[21] Appl. No.: 18,167

[22] Filed: Mar. 7, 1979

[51] Int. Cl.³ .................... G05D 13/62; G06G 7/66; B60L 15/32

[52] U.S. Cl. .................... 364/426; 105/61; 246/182 R; 246/187 C; 364/431

[58] Field of Search .................... 364/424, 426, 431; 246/182 R, 182 C, 186 R, 187 R; 105/61

[56] References Cited

U.S. PATENT DOCUMENTS

| | | | |
|---|---|---|---|
| 3,543,112 | 11/1970 | Richmond | 318/146 |
| 3,651,765 | 3/1972 | Grundy | 105/61 |
| 3,696,758 | 10/1972 | Godinez, Jr. | 105/61 |
| 3,790,778 | 2/1974 | Oster | 105/61 |
| 3,867,647 | 2/1975 | Callahan et al. | 324/163 |
| 3,952,829 | 4/1976 | Gray | 364/424 |
| 3,969,654 | 7/1976 | Grundy et al. | 246/182 R |
| 4,000,872 | 1/1977 | Grundy | 364/426 |
| 4,042,810 | 8/1977 | Mosher | 364/424 |
| 4,118,774 | 10/1978 | Franke | 364/431 |
| 4,138,723 | 2/1979 | Nehmer et al. | 364/426 |

OTHER PUBLICATIONS

Harmon electronics: Set-A-Speed, An Automatic Cruise Control System for Diesel Electric Locomotive, Dec. 13, 1977.

*Primary Examiner*—Felix D. Gruber
*Attorney, Agent, or Firm*—D. A. N. Chase

[57] ABSTRACT

An automatic speed control system for a consist of diesel locomotives conserves fuel by throttling back trailing engines and operating remaining engines at the most efficient throttle position. A control unit in the lead locomotive is operated by the engineer to command control units in equipped trailing locomotives of the consist. In the lead locomotive, depressing a "set speed" push button causes a speed memory to store the existing speed of the consist, and a cutout control signal is generated which is transmitted to trailing units in serial order, i.e., front to rear, by a single spare trainline wire. The control signal has two control voltage levels that increase or decrease with deviations of the speed of the consist from the desired speed in memory. These voltage levels are decoded by each trailing unit and, if power is needed, the engine throttle is set at the most efficient position or, if the locomotive is to be cut out, the throttle is set at a desired minimum position. The trailing units also cause these voltage levels to drop by a fixed amount (equivalent to a predetermined speed increase) as the control signal is conducted by the trainline wire rearwardly in the consist from each trailing unit to the next succeeding trailing unit. In this manner, engines are successively throttled back from the rear of the consist and returned to the higher throttle position from the front to maintain the desired train speed. A hold mode permits the automatic control system to be temporarily disabled without clearing the speed memory or changing the control signal, and depressing a "resume speed" push button on the lead unit reestablishes automatic speed regulation.

20 Claims, 9 Drawing Figures

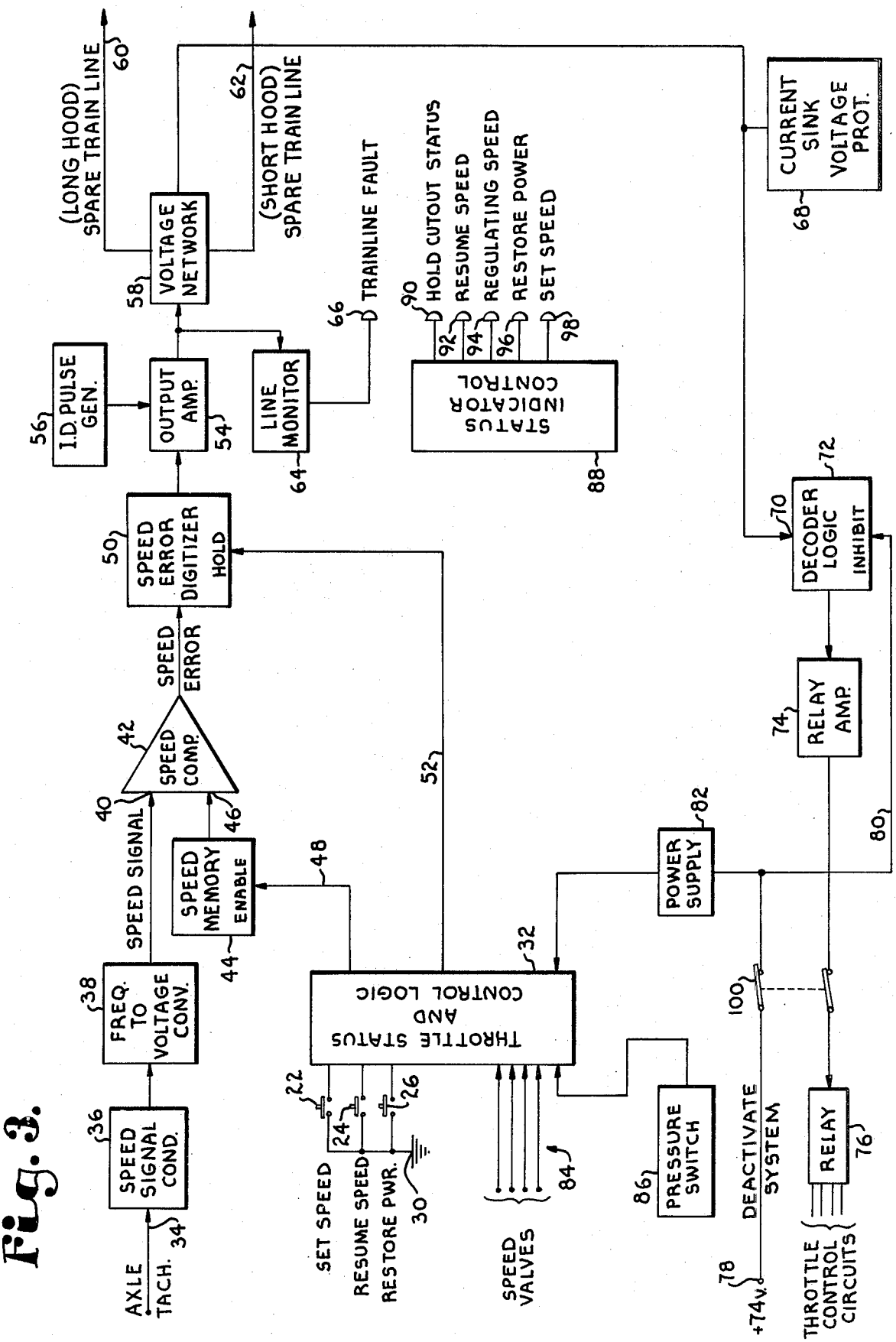

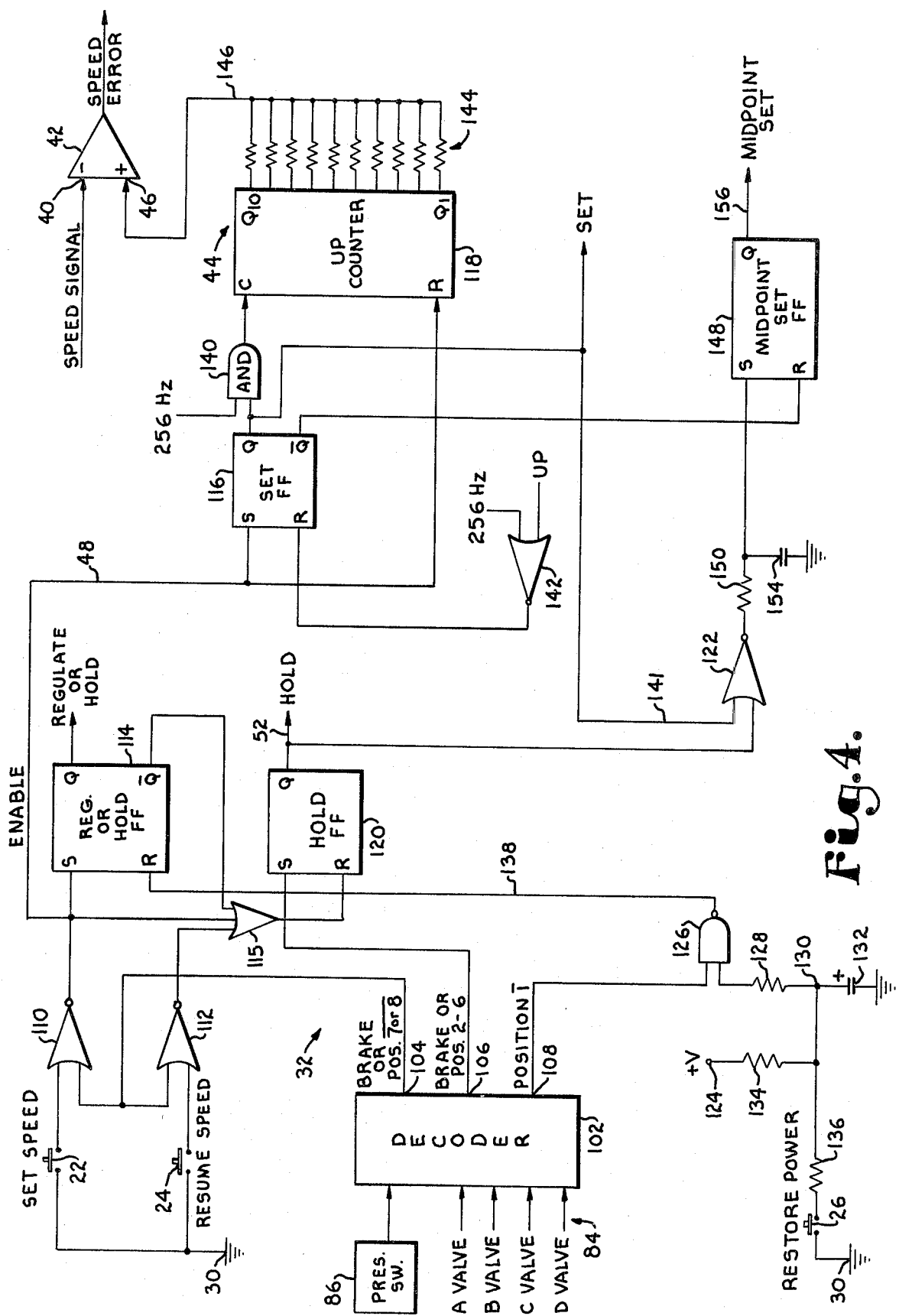

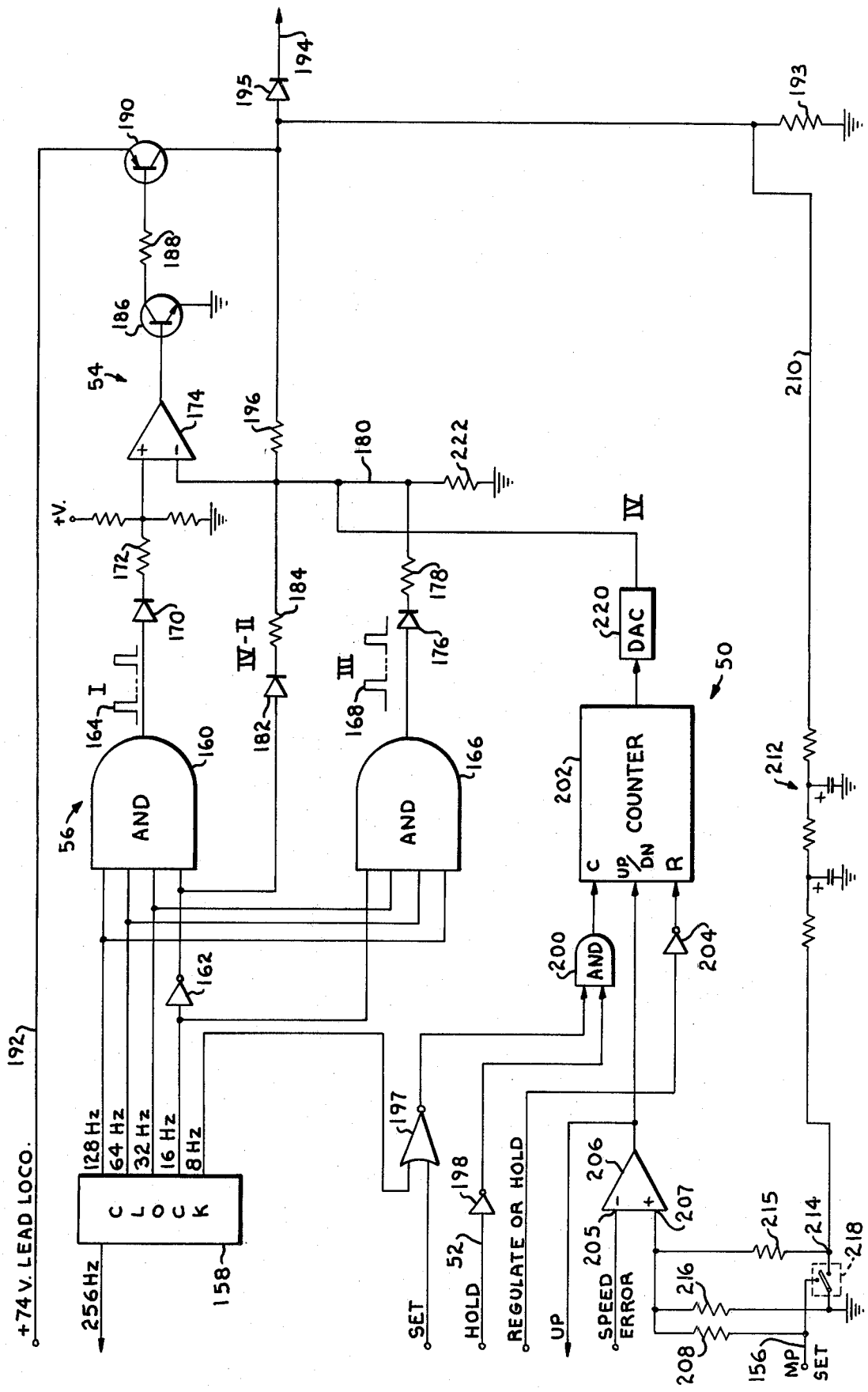

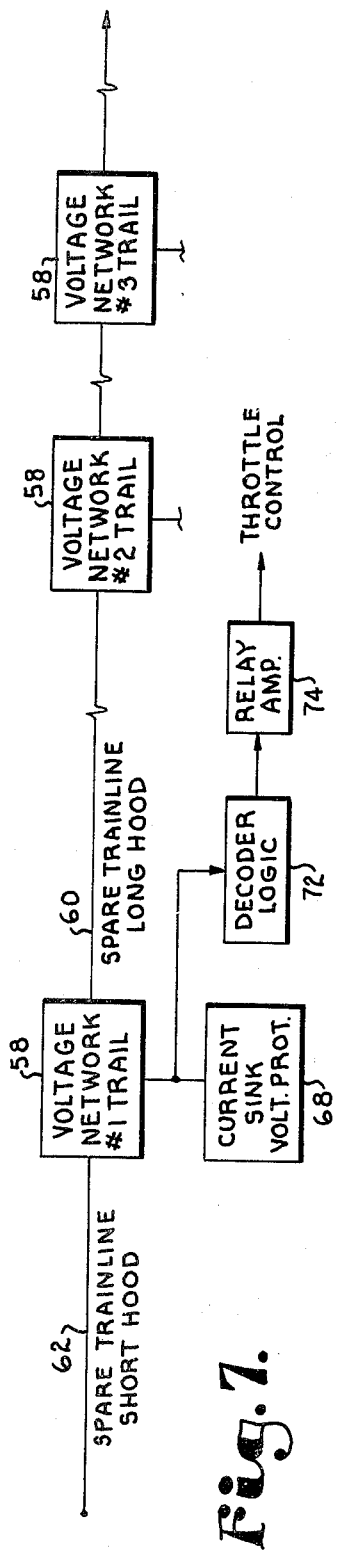
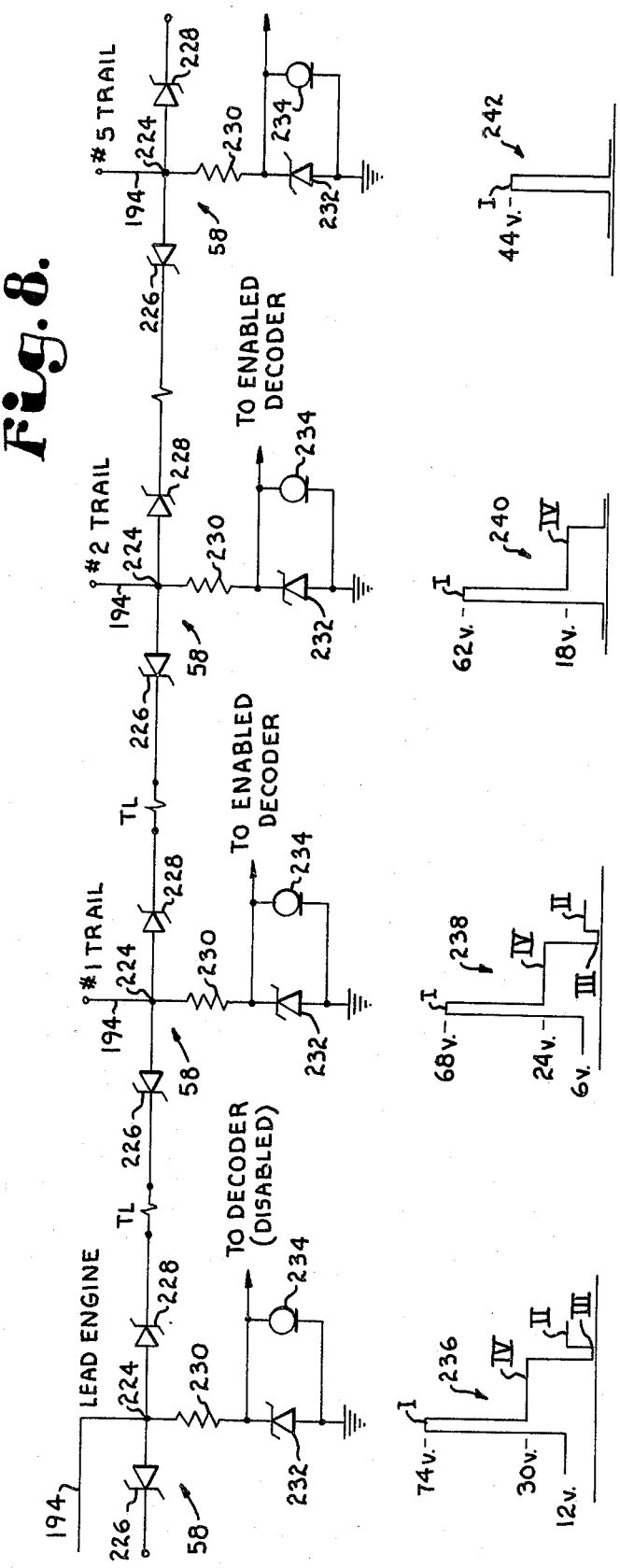
Fig. 7.
Fig. 8.

AUTOMATIC LOCOMOTIVE SPEED CONTROL

This invention relates to improvements in automatic speed control systems for diesel locomotives and, in particular, to an improved energy-efficient system which is fully automatic after the desired operating speed is selected and which throttles back trailing locomotives sequentially from the rear of a consist for best train dynamics.

In recent years the cost of diesel fuel has increased substantially, and the railroads have actively sought ways to conserve fuel and operate diesel electric locomotives more efficiently. Train schedules have been adjusted where possible, improved refueling devices have been devised to minimize fuel spillage, and improved diesel engine components are being used which are inherently more fuel efficient.

The railroads operate high horsepower per ton trains which must adhere to tight schedules. These trains use high horsepower locomotives with turbocharged diesel engines that operate most efficiently at the highest throttle position (throttle notch 8). This characteristic makes it desirable, under certain operating conditions on high horsepower per ton trains, to throttle trailing locomotives back to the lowest throttle position (notch 1) and advance the throttles of leading engines to the highest throttle position to take advantage of the higher efficiency attained. This provides a fuel savings over the usual method of adjusting speed by throttling back all of the locomotives of a consist to an intermediate, less efficient throttle position. Under normal manual control, all trailing engines in a consist follow the throttle settings of the lead engine and, therefore, when the maximum power output of all engines is not needed to maintain speed (which is often the case), a condition of less than maximum fuel efficiency results.

The principle of throttling back trailing locomotives has been tested manually and has confirmed that a fuel savings is achieved. For optimum train dynamics, locomotives should be throttled back sequentially from the rear toward the front of the consist and, conversely, returned on line in the reverse direction from front to rear. The extent of the fuel savings realized, however, varies with the horsepower per ton, the terrain over which the train is operating, and the skill of the engineer who must manually manipulate the controls to throttle back unneeded engines.

It is, therefore, the primary object of the present invention to provide an automatic speed control system for a consist of locomotives which maximizes fuel efficiency by full automatic control of train speed once the desired operating speed is reached or selected.

As a corollary to the foregoing object, it is an important aim of this invention to provide an automatic system as aforesaid which throttles back trailing locomotives sequentially from the rear of the consist when the desired train speed can be maintained by reduced power output, and wherein those locomotives remaining on line are operated with their throttles advanced to the most efficient throttle position.

Another important object of the invention is to provide an automatic system as aforesaid employing control units in the lead locomotive and respective trailing locomotives, wherein only a single spare trainline wire is required as a control line extending from the lead unit (under the control of the engineer) to the units in the trailing locomotives.

Still another important object is to provide an automatic system as aforesaid in which a cutout control signal is generated by the lead unit and is transmitted rearwardly along the control line to successive trailing units, and wherein the control signal is modified as it is conducted rearwardly from unit to unit in a manner such that the throttling back of trailing locomotives is effected from the rear of the consist towards the front.

In accordance with the immediately preceding object, it is a specific aim of the present invention to provide such a control system in which the cutout control signal has control levels determined by the power requirement and to which the trailing units respond, wherein such levels are changed in magnitude by an amount equal to a predetermined speed increase as the control signal is conducted rearwardly in the consist from each trailing unit to the next succeeding trailing unit, in order to provide the aforesaid sequential throttling back of trailing locomotives and the return of such locomotives on line as required to maintain the consist at the desired operating speed.

Yet another important object of this invention is to provide an automatic speed control system utilizing a cutout control signal having the characteristics set forth in the preceding objects, and wherein such signal is employed to induce a hysteresis that provides a predetermined speed difference between the throttled back condition and the throttle advanced condition of each trailing locomotive.

Furthermore, it is an important object of the invention to provide an automatic speed control system for a consist of locomotives which may assume a hold mode of temporary disability and, in such mode, will maintain the cutout status of those trailing locomotives previously removed from the line.

Another important object of the invention is to provide an automatic speed control system which will function with nonequipped locomotives included in the consist.

Additionally, an important object is to provide an automatic speed control system for a consist of locomotives, wherein no set-up addressing of the respective locomotive control units is required for operation.

DESCRIPTION OF THE DRAWINGS

FIG. 3 is a block diagram of one of the identical control units used for either lead or trailing locomotives;

FIG. 4 is a logic diagram and simplified electrical schematic illustrating the throttle status and control logic, and the speed memory shown in the block diagram of FIG. 3;

FIG. 5 is a logic diagram and simplified electrical schematic of the speed error digitizer, identification pulse generator and output amplifier shown in the block diagram of FIG. 3;

FIG. 7 is a block diagram illustrating the manner in which the control units in the respective trailing locomotives are connected in series by the spare trainline;

FIG. 8 is an electrical schematic and wave form diagram showing the voltage networks in the control units of the lead locomotive and the trailing locomotives, and illustrates the 6 volt drop in the control signal from locomotive to locomotive as the signal is transmitted down the trainline.

THE CONTROL SYSTEM IN GENERAL

Figure 1:
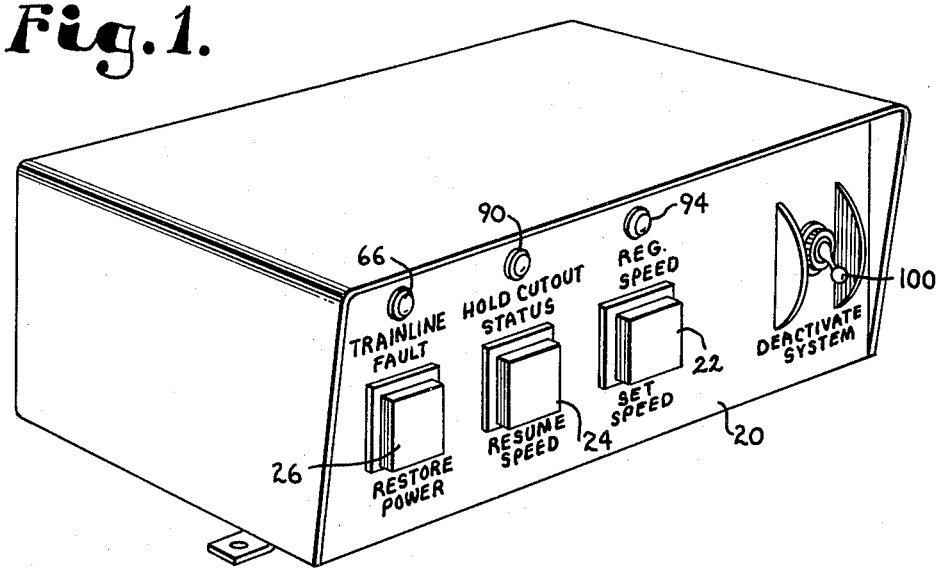
FIG. 1 is a perspective view of the front panel of one of the control units of the system of the present invention, showing the switches under the control of the engineer in the lead locomotive and the lights which indicate the status of the system.

Referring initially to FIG. 1, the housing of one of the control units of the system is shown in front perspective so as to reveal the front panel 20 thereof and the control switches and status lights. Three normally open, pushbutton switches are under the control of the operator and each closes momentarily when its button is depressed. Push button 22 is near the center of the panel and the legend therebeneath ("set speed") indicates that button 22 is pressed when it is desired to place the system in operation and commence automatic speed regulation at the speed that the train is moving at the time button 22 is pressed. A "resume speed" push button 24 is pressed by the operator when it is desired to reestablish automatic control after the system has gone into the hold mode, as will be subsequently discussed. A "restore power" push button 26 is available to drop out automatic control whenever the engineer desires to return to manual control and regain normal throttle response from the leading engine controls. It should be understood that the control push buttons 22, 24 and 26 are operated only on the control unit in the lead locomotive; although each trailing locomotive under automatic control is equipped with an identical control unit, these push buttons are inoperative.

Figure 2:
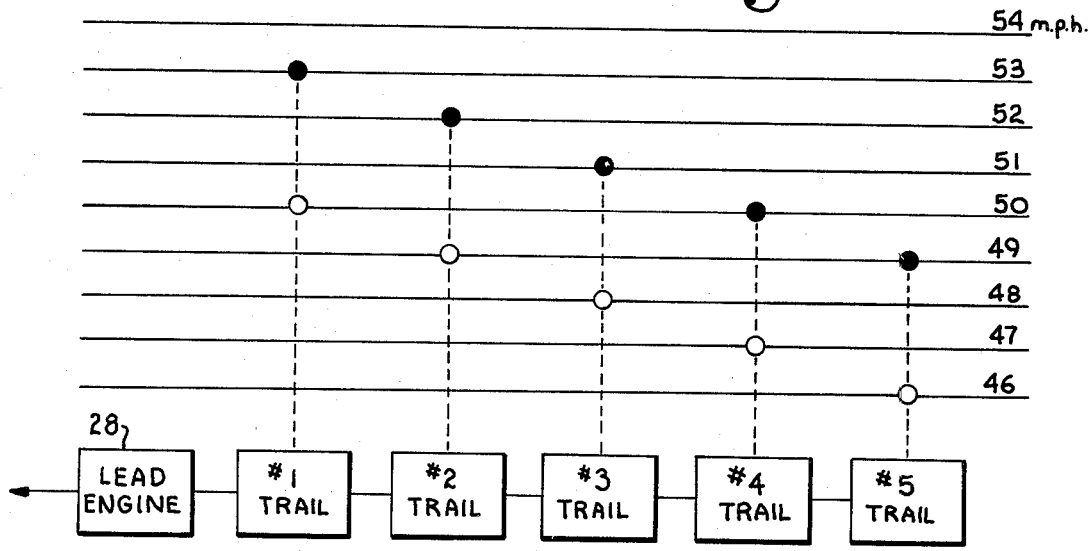
FIG. 2 is a graphical illustration of system operation and portrays the three m.p.h. hysteresis.

In FIG. 2 the illustration of system operation assumes a set speed of 50 m.p.h. and graphically depicts operation in a consist having a lead locomotive 28 and a series of five trailing locomotives designated numerically as Nos. 1, 2, 3, 4 and 5 from the front to the rear of the consist. The solid circles show the respective speeds at which the corresponding trailing locomotives are cut out, i.e., the speed at which the throttle of a given engine is reduced to the lowest powered throttle position (notch 1). The open circles designate the speeds at which the respective trailing locomotives are returned on line, i.e., the speed at which the throttle of a given trailing engine is advanced to the most efficient throttle position (throttle notch 8 in the case of turbocharged diesel engines). Note that the system is designed with a 3 m.p.h. hysteresis, in that the speed difference between the throttled back and high throttle positions of each locomotive is 3 m.p.h. Furthermore, FIG. 2 illustrates that there is a 1 m.p.h. drop in speed from the front to the rear of the series of trailing locomotives, at which power is respectively reduced and reapplied. Accordingly, as will be discussed more fully hereinafter, the automatic system of the present invention successively throttles back engines from the rear of the consist toward the front and returns the same to the high throttle position in reverse order as necessary to maintain the desired operating speed.

The throttle control principles outlined above are equally applicable to normally aspirated engines which operate most efficiently at the fifth throttle notch rather than the eighth. Furthermore, it may be desired in the case of turbocharged engines to drop the throttle setting to only the third notch rather than the first notch in cold weather operation. Accordingly, it is only important that the efficient high throttle position be determined for a given engine and that a desired low throttle position be likewise determined. The system of the present invention will automatically set the throttle at either one or the other of the two selected positions depending upon the speed of the consist in relation to the desired operating speed, as illustrated in FIG. 2.

Although the low throttle position may be other than notch 1 as discussed above, it is currently preferred that a powered notch be selected as the low throttle position rather than the idle notch. This is a peculiarity of diesel engines in present use, as the throttle must be in a powered notch in order to activate the protective features and normal monitoring of the engine system.

Referring to FIG. 3, a block diagram of one of the control units is shown. The installation of the control unit on a locomotive is the same regardless of whether the locomotive is in the lead or is one of the trailing locomotives of the consist. The set speed, resume speed and restore power push buttons 22, 24 and 26 are shown in association with their normally open switch contacts, such switches being connected in parallel between circuit ground at 30 and logic circuitry 32 identified by the legend "throttle status and control logic." A tachometer generator coupled with one of the axles of the locomotive delivers a generally sinusoidal speed signal along an input line 34 to speed signal conditioning circuitry 36 where the speed signal is shaped to provide a square wave output to a frequency-to-voltage converter 38. The speed signal from the generator, of course, has a frequency proportional to the speed of the locomotive. Therefore, the square wave output of the conditioning circuitry 36 comprises a pulse train having a repetition rate proportional to the speed of the locomotive. These pulses trigger a monostable multivibrator in the converter 38, and the output is filtered to a very low ripple factor. Accordingly, the DC output of the converter 38 comprises an analog speed signal fed to one input 40 of a voltage comparator 42, the function of which is to compare the speed signal with the output of a speed memory 44 which appears at the other input 46 of the comparator 42. The memory 44 receives an ENABLE command from the logic circuitry 32 when the set speed button 22 is depressed, as represented by the connecting line 48.

An analog speed error signal is delivered at the output of the comparator 42 is the speed of the consist is different from the set speed (desired operating speed) stored in the memory 44. Such speed error signal is fed to a speed error digitizer 50 which first converts the speed error to a digital representation so that this digital value may be remembered and held if the digitizer 50 receives a HOLD command from the logic circuitry 32, such command being represented in FIG. 3 by a line 52 extending from circuitry 32 to the "hold" input of the digitizer 50. A digital-to-analog converter within the digitizer 50 then returns the speed error to an analog value that is applied to one input of an output amplifier 54 which also receives an identification pulse from an identification pulse generator 56. A composite output signal is delivered by the amplifier 54 and is transmitted through a voltage network 58 to the other control units located in the trailing locomotives. Such trailing units are slave units responsive to the output signal from amplifier 54, such signal being referred to hereinafter as the "cutout control signal" or simply "control signal."

For control purposes, it is customary to provide a locomotive with a trainline connector at both its short hood end and its long hood end. A jumper cable is used to interconnect adjacent end connectors of a pair of tandem locomotives. In this manner, the trainline wires extend continuously from the lead locomotive to the last trailing locomotive of the consist. The automatic control system of the present invention requires one spare trainline wire interconnecting the various control units, an available electrical return being provided by a second trainline wire which is the negative supply lead of the conventional 74 volt DC power system. This single spare trainline is illustrated in FIG. 3 by the spare trainline wire 60 extending from the voltage network 58 to the short hood trainline connector. In the case of a lead locomotive with its short hood forward, no connection is made to the short hood trainline wire 62.

A line monitor 64 detects any defective conditions on the spare trainline. If the cutout control signal from amplifier 54 in the control unit of the lead locomotive is not within proper voltage parameters, the line monitor circuitry energizes a light emitting diode 66 seen from the front panel 20 of the unit (FIG. 1) to indicate a trainline fault.

The control signal from the voltage network 58 is applied to a circuit 68 containing a current sink and a voltage protection device, and is fed to the input 70 of a decoder 72 which, in turn, drives a relay amplifier 74 that controls a relay 76 in the throttle control circuits of the locomotive. In the control unit employed in the lead locomotive, the onboard electrical system supplies 74 volts DC to a power terminal 78 which, via line 80, is connected to an "inhibit" input of the decoder 72. Seventy-four volts is also applied to a power supply 82 which operates power-on reset logic in the throttle status and control logic circuitry 32. Accordingly, in the lead locomotive the decoder 72 is disabled but the logic circuitry 32 is operational. The throttle of the lead engine remains under the control of the engineer, and the cutout control signal is transmitted along the spare trainline 60 to the voltage network 58 of the control unit in the No. 1 trailing locomotive, and thence to the voltage networks 58 of the control units in the succeeding trailing locomotives. In each of the trailing locomotives, the +74 volts is not available at terminal 78 so the decoder 72 is operational and, therefore, the engine throttle is under automatic control.

Remaining inputs to the logic circuitry 32 include leads 84 from the speed valves of the engine which enable the circuitry 32 to monitor the throttle setting selected by the engineer. A pressure switch 86 is responsive to air pressure in the brake line and operates in response to the application of the air brakes. As will be described more fully hereinafter, application of the air brakes or movement of the throttle to certain settings causes the control system to go into the hold mode, in which case automatic speed regulation at the previous set speed is reestablished by depressing the resume speed button 24.

Referring to FIG. 1, five additional light emitting diodes are employed in order to advise the engineer of the status of the system. In FIG. 3 a status indicator control 88 is illustrated and comprises logic circuitry responsive to the status of the system for energizing one or more of these five lights 90, 92, 94, 96 and 98. The lights in FIG. 3 are accompanied by legends which appear on the front panel 20 seen in FIG. 1. The push buttons 22, 24 and 26 are transparent and appropriately colored to permit the corresponding "set speed" light 98, "resume speed" light 92, and "restore power" light 96 to be viewed through the respective push buttons when energized. Preferably, the set speed push button 22 is green and a green lens is employed in conjunction wih the "regulating speed" light 94 thereabove. The resume speed push button 24 is yellow and a yellow lens is likewise used in conjunction with the "hold cutout status" light 90 thereabove. Similarly, the restore power push button 26 is red and a red lens is employed in the "trainline fault" indicator 66.

A normally closed, double pole, single throw switch 100 may be opened to completely deactivate the automatic control system if desired, and is accessible from the front panel 20 as is clear in FIG. 1. The poles of the switch 100 are respectively in series with the line from power terminal 78 and the output of the relay amplifier 74.

CONTROL LOGIC AND SPEED MEMORY

FIG. 4 shows the throttle status and control logic circuitry 32 and the speed memory 44 in greater detail. The condition of four of the solenoid valves A, B, C and D controlled by the engine throttle is monitored by a decoding network 102, along with the status of the air brakes as indicated by pressure switch 86. The network 102 has three outputs 104, 106 and 108 which are also designated by the logic expressions BRAKE OR POSITION $\overline{7\ OR\ 8}$, BRAKE OR POSITION 2-6, and POSITION $\overline{1}$ respectively. Accordingly, when output 104 is at the high logic level, either the air brakes are applied or the engine throttle is neither in position 7 nor 8. Conversely, when output 104 assumes the low logic level, the throttle is in the seventh or eighth notch and the brakes are not being applied.

The high logic level at output 106 appears when the brakes are applied or when the throttle is in any of positions 2, 3, 4, 5 or 6. Otherwise, output 106 is at the low logic level. Similarly, the high level is present at output 108 any time the throttle is not in position 1, and the low logic level is present when the throttle is in position 1.

This basic throttle and brake status logic set forth above and shown in FIG. 4 is applicable to turbocharged diesel engines that operate most efficiently at the highest throttle position (throttle notch 8). Notch 7 is the next most efficient. In the illustrated embodiment, the automatic speed control system may be activated by the engineer in the lead locomotive so long as the throttle in the lead locomotive is either at position 7 or 8, and the brakes are not applied. The trailing engines will then be automatically operated at either notch 1 or notch 8 depending upon the power required.

The output 104 from decoding network 102 is connected to one input of each of two, two-input NOR gates 110 and 112. The other input of NOR gate 110 is normally at the high logic level but goes low (as illustrated by circuit ground 30) when the set speed push button 22 is depressed to momentarily close its associated contacts. Likewise, the second input of NOR gate 112 is normally high but goes low when the resume speed push button 24 is depressed.

The NOR gate 110 generates the logic signal ENABLE when both of its inputs are low, such ENABLE signal being fed to the set input S of a "regulate or hold" flip-flop 114, and via OR gate 115 to the reset input R of a "hold" flip-flop 120. Both flip-flops 114 and 120 are of the set-reset type. The ENABLE signal also appears on line 48 and is delivered to the set input S of a "set" flip-flop 116 of the set-reset type, and to the reset input R of an up counter 118.

When flip-flop 114 is set, its Q input is at the high logic level and provides the logic signal REGULATE OR HOLD. The NOT Q output of flip-flop 114 and the output of NOR gate 112 are connected by the OR gate 115 to the reset input R of flip-flop 120. The set input S of flip-flop 120 is connected to the output 106 of the decoding network 102. When set, the Q output of flip-flop 120 delivers the logic signal HOLD along line 52 and to one input of a two-input NOR gate 122.

A +V power terminal 124 in the lower lefthand corner of FIG. 4 provides supply voltage only when power supply 82 (FIG. 3) is energized by the presence of 74 volts at power terminal 78, which occurs only when the control unit is under operation in a lead locomotive. A two-input NAND gate 126 has one input thereof connected to the output 108 of decoding network 102, and the other input thereof connected through a resistor 128 to a junction point 130. A capacitor 132 is connected from junction point 130 to circuit ground, a resistor 134 connects the +V terminal 124 to junction point 130, and a resistor 136 interconnects junction point 130 and the contacts of the restore power push button switch 26. When power is applied at terminal 124, the input of NAND gate 126 to which resistor 128 is connected remains at the low logic level until capacitor 132 charges (typically ½ second), so that the output of NAND gate 126 will be momentarily at the high logic level irrespective of the position of the engine throttle. This resets flip-flop 114 via a lead 138 extending from the output of NAND gate 126 to the reset input R thereof. Likewise, during operation of the automatic control system, depressing the restore power push button 26 momentarily discharges the capacitor 132 to also reset the flip-flop 114.

Referring to the speed memory 44, the Q output of the set flip-flop 116 is connected to one input of a two-input AND gate 140, the other input thereof receiving clock pulses at a frequency of 256 Hz. The output of AND gate 140 is connected to the clock input C of the up counter 118. When flip-flop 116 is set, its Q output provides the logic signal SET to AND gate 140, to NOR gate 122 via a lead 141, and to circuitry in FIG. 5 to be subsequently discussed.

A NOR gate 142 has two inputs receiving the 256 Hz clock pulses and the logic signal UP respectively. The UP signal is generated in the speed error digitizer 50 to be described in detail in connection with FIG. 5. The output of NOR gate 142 is connected to the reset input R of flip-flop 116.

The up counter 118 is a binary counter having outputs $Q_1$ through $Q_{10}$. A bank of ten resistors 144 is connected to the $Q_1$–$Q_{10}$ outputs, each of such resistors extending from a corresponding output to a common lead 146 which is connected to the noninverting input 46 of the speed comparator (differential amplifier) 42. The resistors 144 have ohmic values selected such that the resistor bank functions as a digital-to-analog converter and sets the voltage at the noninverting input 46 of the comparator 42 at a level representing the desired operating speed of the locomotive consist. This is compared to the actual speed of the consist which appears as a voltage at the inverting input 40 as previously described.

A "midpoint set" flip-flop 148 of the set-reset type has its reset input R connected to the NOT Q output of flip-flop 116. A resistor 150 connects the output of NOR gate 122 to the set input S of flip-flop 148. A capacitor 154 is connected from this input S to circuit ground and, in conjunction with resistor 150, provides a temporary memory of the status of the hold flip-flop 120. When the flip-flop 148 is set, its Q output delivers the logic signal MIDPOINT SET along a lead 156 to the speed error digitizer 50 shown in detail in FIG. 5.

SPEED ERROR DIGITIZER, IDENTIFICATION PULSE GENERATOR AND OUTPUT AMPLIFIER

Referring particularly to FIG. 5, the speed error digitizer 50, identification pulse generator 56, and output amplifier 54 are illustrated in detail. A clock generator 158 produces harmonically related clock pulses at the frequencies indicated, the 16, 32, 64 and 128 Hz clock pulses being delivered to respective inputs of a four-input AND gate 160. It should be noted that the 16 Hz clock is inverted by an inverter 162 ahead of the AND gate input. The AND gate 160 decodes the input clock pulses and functions as a 1 out of 16 decoder, with the result that the output of AND gate 160 goes to the high logic level for 4 msec. out of every 64 msec. This is illustrated in FIG. 5 by the successive pulses 164 from the output of AND gate 160. These output pulses 164 cause each repetition of the cutout control signal (FIG. 6) to have an initial, high voltage level I which provides an identifier pulse.

A four-input AND gate 166 also receives the 16, 32, 64 and 128 Hz clock pulses but the 16 Hz clock is not inverted. Accordingly, AND gate 166 functions the same as AND gate 160 except that the 4 msec. output pulses 168 thereof are displaced 32 msec. in time as compared with the output pulses 164 from AND gate 160. The output pulses 168 from AND gate 166 cause each repetition of the cutout control signal (FIG. 6) to assume a minimum voltage level designated III.

Figure 6:
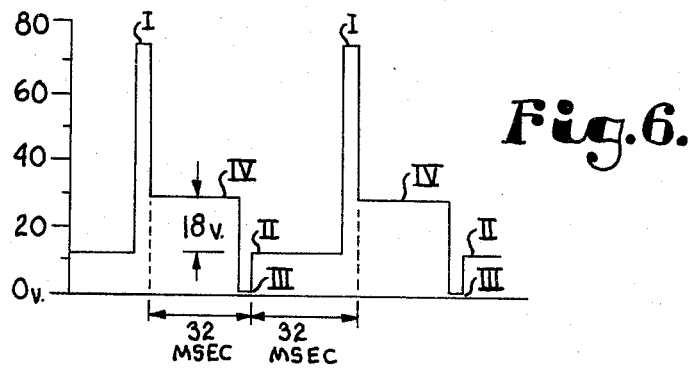
FIG. 6 is a wave form diagram showing the cutout control signal at midband.

The output of AND gate 160 is connected by a series diode 170 and resistor 172 to the noninverting input of an operational amplifier 174. The output of AND gate 166 is connected by a series diode 176 and resistor 178 to a lead 180 that extends to the inverting input of the amplifier 174. The inverted 16 Hz clock pulses are also fed to the inverting input of amplifier 174 by a series connected diode 182 and resistor 184. The resistor 184 has an ohmic value selected to establish an 18 volt difference between voltage level IV and voltage level II of the cutout control signal wave form (FIG. 6).

An NPN transistor 186 has its emitter grounded and its base connected to the output of amplifier 174. A resistor 188 connects the collector of transistor 186 to the base of a PNP transistor 190. Transistors 186 and 190 function as a voltage level converter. The emitter of transistor 190 is connected to a power lead 192 identified "+74 V lead loco." The collector of transistor 190 delivers the output of the amplifier circuit across a load resistor 193, such output being the cutout control signal illustrated at midband in FIG. 6. The control signal is fed to the voltage network 58 (FIG. 3) along an output lead 194 in which an isolation diode 195 is interposed. A feedback resistor 196 is connected from the collector of transistor 190 back to the inverting input of amplifier 174.

It should be understood that supply voltage will only be present on power lead 192 in the lead locomotive of the consist. The power lead 192 is connected to an available throttle switch in order to sense movement of the throttle off the idle notch. Accordingly, in any powered notch, 74 volts is present on power lead 192. Since the throttle in each of the trailing locomotives is not manually operated, it remains in the idle notch and, therefore, supply voltage is not present on lead 192.

The SET logic signal from the Q output of flip-flop 116 (FIG. 4) is fed to one input of a two-input NOR gate 197, the other input thereof being connected to the 8 Hz output of clock generator 158. The HOLD logic signal on line 52, after inversion at 198, is fed along with the output of NOR gate 197 to the respective inputs of a two-input AND gate 200, the output of which is connected to the clock input C of an up/down binary counter 202. The REGULATE OR HOLD logic signal from the Q output of flip-flop 114 (FIG. 4), after inversion at 204, is fed to the reset input R of counter 202. The counter is commanded to count either up or down, and is provided with an up/down input as indicated. The speed error signal from the output of comparator 42 is fed to the inverting input 205 of an operational amplifier 206, the output of which is connected to the up/down input of counter 202.

The output of amplifier 206 also provides the UP logic signal which is delivered to one input of the NOR gate 142 in FIG. 4. The lead 156 from the Q output of flip-flop 148 is connected by a resistor 208 to the noninverting input 207 of amplifier 206.

A return loop extends from the collector of transistor 190 to the noninverting input 207 of amplifier 206, and is traced along a lead 210 to an integrating network 212, then to a junction point 214, and then to input 207 via resistor 215. A resistor 216 is connected from input 207 to ground. A FET switch 218 is connected from junction point 214 to ground and is controlled by the logic level on lead 156.

The counter 202 has a binary output that is converted to an analog value by a digital-to-analog converter 220 which is connected to the lead 180 (inverting input of amplifier 174). The converter 220 may comprise a resistor bank similar in function to the ten resistors 144 (FIG. 4) employed in the speed memory 44 as a digital-to-analog converter responsive to the output of up counter 118. Accordingly, the digital-to-analog converter 220 would serve as a variable current source across a resistor 222 connected from lead 180 to circuit ground, thereby providing a voltage level at the inverting input of amplifier 174 that corresponds to the count contained in counter 202. As represented by the designation IV in FIGS. 5 and 6, the digital-to-analog converter 220 establishes voltage level IV of the wave form of the cutout control signal.

THE CONTROL SIGNAL VOLTAGE DROP FROM UNIT TO UNIT

FIG. 7 illustrates the manner in which the control units in the respective trailing locomotives are connected in series by the spare trainline. It may be appreciated that the cutout control signal generated in the lead locomotive is transmitted to the voltage network 58 of the control unit in the No. 1 trailing locomotive via the spare trainline 62 from the No. 1 trailing locomotive's short hood trainline connector, assuming that the short hood is forward. The control signal is transmitted on from such voltage network by the spare trainline 60 that extends to the long hood trainline connector, and thence by a trainline jumper cable to the adjacent trainline connector of the No. 2 trailing locomotive. The control signal is conducted through the voltage network 58 of the control unit in the No. 2 trailing locomotive, and then on via the spare trainline to the voltage network 58 of the control unit in the No. 3 locomotive, etc. to the end of the consist. Accordingly, the spare trainline provides a transmission line for the control signal that extends from the control unit in the lead locomotive to the control units in the trailing locomotives in serial order.

FIG. 8 illustrates the action of the voltage networks 58 as the control signal is transmitted down the trainline. The lead engine is at the left, and the control unit therein produces the cutout control signal that appears on output lead 194. The lead 194 extends to a junction point 224 to which two zener diodes 226 and 228 are connected in back-to-back relationship (anodes connected to junction point 224). Diode 226 is connected to the trainline wire that extends from the short hood trainline connector, and thus is effectively out of the circuit in the lead engine control unit. A series connected resistor 230 and a 75 volt zener diode 232 are connected from the junction point 224 to circuit ground. With its anode at circuit ground (negative supply), the zener diode 232 protects the circuitry against transients on the trainline having a voltage greater than the +74 volt supply potential. Therefore, diode 232 is normally nonconductive, and a relatively small, constant current (typically 6 ma.) normally flows through a current sink 234 connected in parallel with the diode 232. The current sink allows operation of the control unit with up to 5 ma. of leakage to the positive supply. Since the decoder 72 is disabled in the control unit of the lead locomotive, the cutout control signal is simply transmitted on to the No. 1 trailing locomotive via diode 228 and the interconnecting trainline TL. A wave form 236 beneath the circuit diagram shows the cutout control signal as it would appear unmodified at midband, a condition in which the Nos. 1, 2, 3 and 4 trailing locomotives are at throttle notch 8, and the No. 5 trailing locomotive is throttled back to notch 1.

In the No. 1 trailing locomotive, the control signal flows to the junction point 224 but encounters the zener diode 226 which, as illustrated by the wave form 238, induces a 6 volt drop in the control signal. The control signal is conducted from such junction point 224 by the diode 228 and trainline TL to the control unit in the No. 2 trailing locomotive, where the control signal again undergoes a 6 volt drop by the action of the zener diode 226. The wave form 240 illustrates the control signal as it now appears at junction point 224 in the voltage network 58 of the control unit in the No. 2 trailing locomotive. This 6 volt drop from unit to unit continues down the line, the resultant wave form at junction point 224 in the control unit of the last, No. 5 trailing locomotive being illustrated at 242. The 6 volt drop from unit to unit caused by the zener diodes 226 in the respective trailing engine control units is equivalent to a speed change of 1 m.p.h. as graphically illustrated in FIG. 2.

CONTROL SIGNAL DECODER

Figure 9:
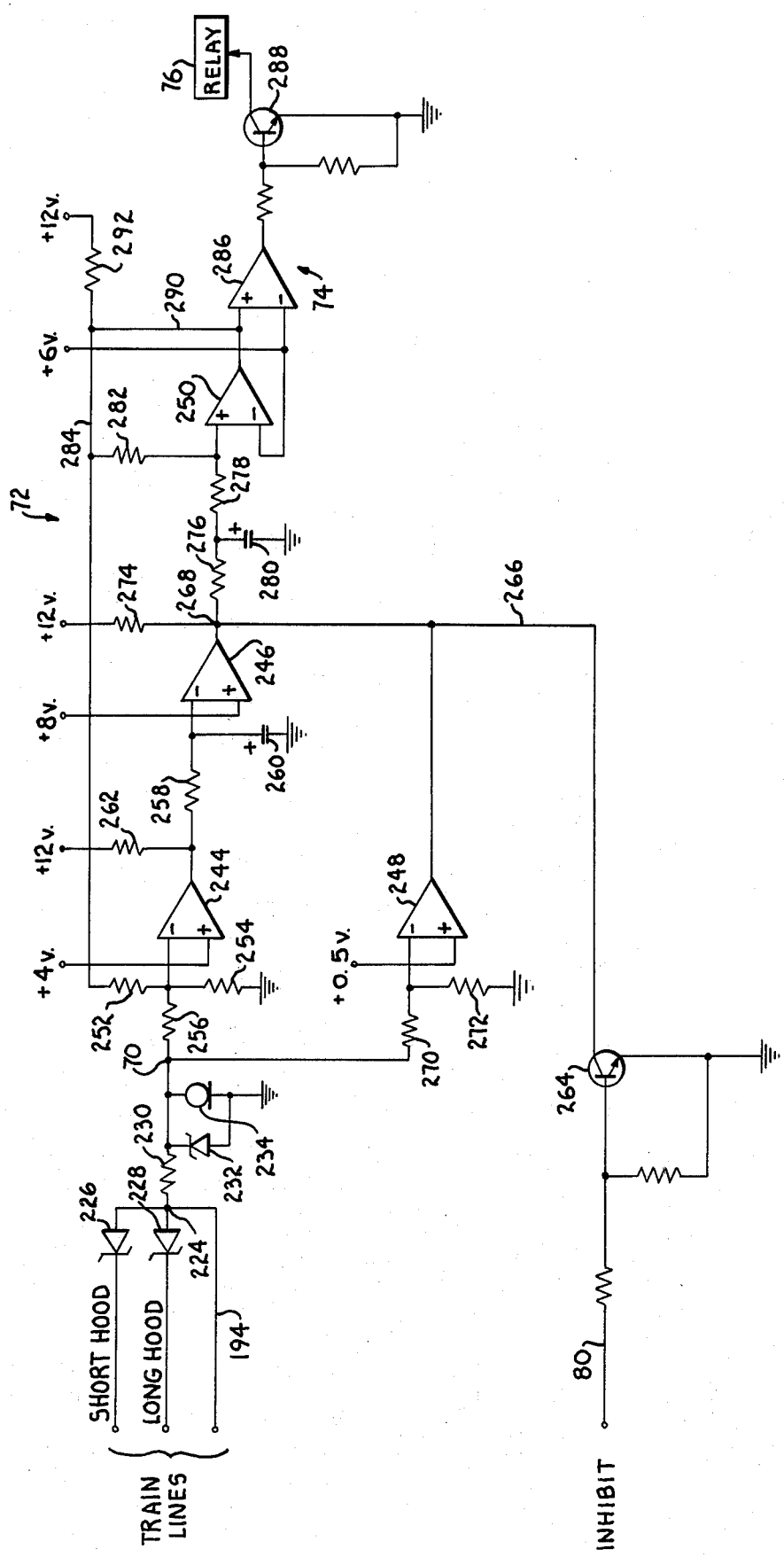
FIG. 9 is an electrical schematic diagram of the voltage network, current sink and voltage protection circuitry, decoder logic, and relay amplifier shown in FIG. 3.

Referring to FIG. 9, the decoder 72 employs four voltage comparators 244, 246, 248 and 250 and associated circuitry to recognize the identifier pulse portion of the cutout control signal (level I) and detect the control levels II and IV thereof (see FIG. 6). Each of the voltage comparators is an integrated circuit component which either presents an open circuit at its output (when the voltage at its non-inverting input is greater than the voltage at its inverting input) or switches its output to circuit ground (when the voltage at its inverting input is greater than the voltage at its noninverting input).

The voltage comparator 244 serves as a threshold detector, a bias voltage at its inverting input being established by voltage divider resistors 252 and 254. The supply voltages to the various components are as indicated by the legends accompanying the respective supply terminals.

The cutout control signal is fed to the inverting input of comparator 244 by input resistor 256. The noninverting input thereof is maintained at 4 volts as indicated. Resistor 252 is very large as compared with resistor 254 (typically 20 times the ohmic value of resistor 254), and the value of input resistor 256 is selected such that a threshold of approximately 30 volts is defined. Accordingly, whenever level I of the identifier pulse is over 30 volts, the output of comparator 244 goes to ground for the 4 msec. period.

The output of comparator 244 is connected by a resistor 258 to the inverting input of comparator 246, and a capacitor 260 extends from such inverting input to ground. A resistor 262, typically 40 times the ohmic value of resistor 258, is connected from the 12 volt supply to the output of comparator 244. The noninverting input of comparator 246 is maintained at +8 volts. Accordingly, when the output of comparator 244 goes to ground in response to the identifier pulse, capacitor 260 discharges relatively rapidly through resistor 258. After the 4 msec. identifier pulse, the capacitor 260 is permitted to recharge at a much slower rate via resistor 262. The result is that the voltage across capacitor 260 is maintained at a relatively low level as compared with the 8 volts on the noninverting input of comparator 246, due to the repetitive discharging thereof through resistor 258. However, if the identifier pulse is lost (signifying that a valid control signal is not on the trainline wire) the capacitor 260 is permitted to charge to 12 volts and this forces the output of comparator 246 to ground.

The effect of the loss of the identifier pulse, insofar as the decoder 72 is concerned, is the same as the inhibit function executed by line 80. It will be recalled that in the lead locomotive +74 volts is on lead 80, but is not applied to lead 80 when the control unit is in a trailing locomotive. The presence of the positive supply voltage on lead 80 in the lead locomotive causes NPN transistor 264 to conduct, thereby grounding the output of comparator 246 via a lead 266. Therefore, either the inhibit function or failure of identifier pulses to be recognized by the trailing engine control units effectively short-circuits junction point 268 (at the output of comparator 246) to ground. With point 268 at ground, the relay 76 cannot be energized to cut off (throttle back) the locomotive.

To now illustrate normal automatic speed control system operation, it will be initially assumed that junction point 268 is not grounded and that the output of comparator 246 is an open circuit. Therefore, the comparator 248 is permitted to operate and performs a gating function by sensing levels II and IV of each incoming control signal. A resistor 270 connects the decoder input 70 to the inverting input of comparator 248, and a resistor 272 is connected from such inverting input to ground. The noninverting input is maintained at +0.5 volts. When both levels II and IV are at 6 volts or greater (as is the case, for example, for the lead and first trailing locomotive in FIG. 8 as shown by the wave forms 236 and 238), then the output of comparator 248 is forced to ground. When both levels II and IV are below 6 volts (No. 5 trailing locomotive in FIG. 8 as shown by wave form 242), the output of comparator 248 is an open circuit 100 percent of the time. In the intermediate conditions where level IV is at 6 volts or above but level II is not (see wave form 240 in FIG. 8 for the No. 2 trailing locomotive, and such condition also exists in No. 3 and No. 4 trail), a square wave output from comparator 248 results, the effect of which will be explained below.

A resistor 274 is connected from the 12 volt supply to junction point 268, two series resistors 276 and 278 connect point 268 to the noninverting input of comparator 250, and a capacitor 280 is connected from the common ends of these two resistors to ground. A resistor 282 is connected from an essentially 12 volt supply lead 284 to the noninverting input of comparator 250. It is instructive to note representative relative sizes of these four resistors, as follows:

| Resistor 274 | 10,000 ohms |
| Resistor 276 | 200,000 ohms |
| Resistor 278 | 20,000 ohms |
| Resistor 282 | 390,000 ohms |

The output of comparator 250 drives an operational amplifier 286 which, in turn, operates an NPN transistor switch 288. When transistor 288 is in conduction, its emitter-collector circuit provides a ground connection for the relay 76 and energizes the relay to cut out the locomotive. (For clarity, the "deactivate system" switch 100 illustrated in FIG. 3 is omitted in FIG. 9).

Assuming normal operation of the system with both voltage levels II and IV of the control signal below 6 volts, the output of comparator 248 is open and there is nothing to discharge capacitor 280. Therefore, capacitor 280 continues to charge with the result that the output of comparator 250 is driven to +12 volts. The output of comparator 250 and the noninverting input of operational amplifier 286 are interconnected, and are connected to the power lead 284 by a lead 290. The series resistor 292 in power lead 284 is relatively small, such as 5000 ohms. Accordingly, the transistor switch 288 is turned on and the relay 76 is energized to throttle back the engine.

Assuming that the speed of the locomotive consist now decreases and level IV of the cutout control signal reaches and exceeds 6 volts (but level II does not), the output of comparator 248 becomes a square wave but relay 76 remains energized. This is because of the hysteresis imparted to the system by levels II and IV and the relatively large resistors 276 and 282. The capacitor 280 (typically 10 uf.) cannot discharge sufficiently to change the state of the comparator 250 until such time that both levels II and IV of the control signal reach or exceed 6 volts and junction point 268 is shorted to ground 100 percent of the time. Once this occurs, the capacitor 280 discharges and the voltage on the noninverting input of comparator 250 falls below the 6 volts applied to the inverting input thereof, thereby switching the output of comparator 250 to ground and removing the drive from the operational amplifier 286 (which has 6 volts standing on its inverting input). Accordingly, the transistor switch 288 opens and the relay 76 drops out to return the engine to throttle notch 8.

The hysteresis just discussed is the 3 m.p.h. hysteresis mentioned earlier in this specification and illustrated graphically in FIG. 2. The 3 m.p.h. difference is equal to 18 volts in terms of the magnitude of the control signal, and 18 volts is the difference between the levels IV and II when both are above zero.

The hysteresis is also present when the speed of the consist is increasing and levels II and IV of the control signal are decreasing, in which case the capacitor 280 will not charge sufficiently to overcome the 6 volts standing on the inverting input of comparator 250 until both levels II and IV are below 6 volts and, therefore, 12 volts is available at junction point 268 100 percent of the time. Accordingly, once a given locomotive is cut off, the speed of the consist must decrease 3 m.p.h. before that locomotive is returned on line. Conversely, once put on line at a particular speed, the consist must increase 3 m.p.h. above that speed before the locomotive is cut off.

OPERATION

In operation, the engineer brings the throttle of the lead locomotive out to seventh or eighth notch. The control system is not yet activated, and the trailing engines function normally (i.e., follow the throttle setting of the lead engine). When the train has accelerated to the desired opening speed, the engineer presses the set speed push button 22 to set up the speed memory 44. Referring to FIG. 4, this produces the logic signal ENABLE to set flip-flops 114 and 116 and reset the up counter 118. (The ENABLE command is also applied to the reset input R of hold flip-flop 120.) Setting flip-flop 116 produces the SET logic signal and up counter 118 now receives 256 Hz clock pulses through AND gate 140. The counter 118 counts up until the analog level on lead 146 represents the then existing speed of the train.

Referring to FIG. 5, the speed error signal is fed to the inverting input 205 of amplifier 206, which is a voltage comparator. At the commencement of the memory set-up sequence, the output of amplifier 206 is high. This is the UP logic signal applied to NOR gate 142 in FIG. 4. Until such time that the speed signal at input 40 of comparator 42 is offset by the digital equivalent in counter 118, this UP input of NOR gate 142 remains high. Therefore, NOR gate 142 does not open until the signals at comparator inputs 40 and 46 result in an increased output voltage level from comparator 42 that drives the output of amplifier 206 low, at which time flip-flop 116 is reset on the next low in the train of 256 Hz clock pulses. Once flip-flop 116 is reset, the set speed (desired operating speed) is retained in memory in the up counter 118 and is not disturbed until such time that the set speed push button 22 is again depressed.

During the time that counter 118 is counting up, the SET command holds NOR gate 197 (FIG. 5) closed to prevent 8 Hz clock pulses from reaching the clock input C of counter 202 in the speed error digitizer 50. However, once the set speed is in memory and flip-flop 116 is reset, gate 197 is open and counter 202 will count up or down depending upon the command at its up/down input, the counter reset having been removed by the REGULATE OR HOLD logic signal from flip-flop 114. (When counter 202 was reset, its output was zero and the output of amplifier 54 at the collector of transistor 190 was 74 volts for both levels I and IV of the control signal).

Assuming the standby condition in which the hold flip-flop 120 is reset before the set speed push button 22 is depressed, its Q output is low and, likewise, the corresponding input of NOR gate 122 is low. Likewise, just prior to the generation of the SET command by flip-flop 116, lead 141 (and the input of NOR gate 122 to which it is connected) is at the low logic level. The output condition of NOR gate 122 at this time is temporarily remembered by the RC network of resistor 150 and capacitor 154. The effect is to remember the status of the hold flip-flop 120. If flip-flop 120 was not set just prior to setting the speed by pressing push button 22, the output of NOR gate 122 was at the high logic level. Accordingly, under these circumstances, flip-flop 148 is set by this remembered condition at the time that flip-flop 116 is set (which removes the reset from flip-flop 148). The result is that the Q output of flip-flop 148 produces the logic signal MIDPOINT SET which appears as a high logic level voltage on lead 156. Referring to FIG. 5, this positive level provides a reference voltage for the noninverting input 207 of amplifier 206 by the voltage divider formed by resistor 208 and two parallel resistors 215 and 216. These latter two resistors are now in parallel since the positive level on lead 156 closes the FET switch 218 to ground junction point 214. This establishes the initial, midband configuration of the cutout control signal illustrated in FIG. 6, with all trailing locomotives on line except No. 5. Therefore, when the output voltage from amplifier 206 goes to ground (low logic level) by the equalization of the voltage levels at its inputs 205 and 207, the UP command terminates and flip-flop 116 is reset to hold the set speed count in up counter 118. This also resets flip-flop 148 to remove the MIDPOINT SET command; thus lead 156 goes to ground and the FET switch 218 opens to activate the return loop in the control signal generating circuitry of FIG. 5. With FET switch 218 open and lead 156 at ground, the input 207 of amplifier 206 is now connected to a voltage divider comprising resistor 215 and parallel resistors 208 and 216.

Having stored the set speed in memory and established the control signal at midband, the up/down counter 202 is now free to follow deviations in the speed of the train from the set speed. Clock pulses at the 8 Hz frequency are applied to the clock input C of counter 202 and, assuming that there is no speed error, the counter alternately counts up one and then down one, back and forth.

In FIGS. 2 and 8, a consist of six locomotives has been selected for illustration of the operation of the automatic speed control system of the present invention. Utilization of the system with five trailing locomotives under control is illustrative only, it being appreciated that the system may be employed with a lesser number of trailing locomotives under control, or with a greater number within the limits of the 74-volt control level range provided by the cutout control signal. Furthermore, trailing locomotives not equipped with the control units of the system may be included in the consist.

In the six-locomotive consist selected for illustration herein, the cutout control signal at midband cuts out the No. 5 trailing locomotive. Therefore, beginning from a standby condition as described above, depressing the set speed push button 22 after acceleration to the desired operating speed causes the No. 5 trailing locomotive to be cut out. The control levels II and IV of the control signal at midband are such that the No. 4 trailing locomotive is about to be cut out. This is because level IV is at 6 volts at the junction point 224 in the voltage network 58 of the control unit in the No. 4 trailing locomotive, such level having decreased in 6 volt increments from the initial 30-volt level at the output of amplifier 54 (output lead 194) in the lead locomotive.

If the train continues to increase speed after the No. 5 trailing locomotive is cut out, the voltage level of the speed signal at input 40 of comparator 42 increases to cause the output (speed error) of comparator 42 to decrease. This, in turn, drives the output of amplifier 206 to the positive logic level to command the counter 202 to count up, thereby increasing the voltage level at the inverting input of amplifier 174. This drives the output of amplifier 174 down, thereby decreasing the drive to transistor 186 and forcing level IV of the cutout control signal to decrease. The resistor 184 maintains the 18-volt difference between level IV and level II, so level II likewise decreases by a corresponding amount. As level IV in the control signal at junction point 224 in the control unit of the No. 4 trailing locomotive falls below 6 volts, the relay 76 in that unit is energized to reduce the throttle setting to notch 1 as previously described under the heading "Control Signal Decoder."

In order to permit sufficient time for the cutout of a locomotive or the return of a locomotive on line to affect the speed of the train, the return loop in FIG. 5 prevents the overshoot that would otherwise occur due to the lag between cutout or turn-on of a given locomotive and a corresponding change in the leevel of the speed signal at the input 40 of comparator 42. In the instant illustration where control level IV decreased to cut out trailing locomotive No. 4, the voltage output of integrating network 212 (appearing at junction point 214) likewise decreased to reduce the positive level at the noninverting input 207 of amplifier 206. This matches the decreased level of the speed error signal at the inverting input 205 so that the counter 202 will not count up further or count down (other than one count alternately in each direction) unless and until there is an additional change in the speed error signal.

The operation of the circuitry of FIG. 5 is the same as above, only opposite, should the speed of the train decrease from set speed. In that case, the output of comparator 42 increases and drives the output of amplifier 206 to ground. This commands the counter 202 to count down and the voltage level at the inverting input of amplifier 174 decreases. This increases the drive to transistor 186 and, therefore, raises the magnitude of level IV of the cutout control signal. It should be understood that the speed error signal could be applied directly to the inverting input of amplifier 174 if it were not for the provision of a hold mode (to be explained), plus an additional advantage of the speed error digitizer is that its relatively slow response to the speed error signal prevents the system from responding to slippage of the wheels of the locomotive on the track.

If the engineer moves the throttle on the lead locomotive out of the seventh or eighth notch to any of notches 2 through 6, flip-flop 120 (FIG. 4) is set and the system goes into the hold mode. This also occurs if the air brakes are applied. The HOLD logic signal from the Q output of flip-flop 120 closes AND gate 200 (FIG. 5) so that, in the hold mode, counter 202 is frozen at the count just previously stored. This causes the cutout signal to remain the same so that locomotives previously removed from the line remain cut out. Automatic control is reestablished by pressing the resume speed push button 24 which resets the hold flip-flop 120 and permits normal operation of the up/down counter 202 so that the control signal may be changed in order to provide the power requirement that will return the train to the set speed.

If, while in the hold mode, the engineer desires to change to a new set speed, he merely depresses the set speed push button 22 as before and the system readjusts to the new set speed by repeating the set-up sequence and storing the new set speed in the up counter 118. However, unlike setting up the speed memory from the standby condition, if from the hold condition the midpoint set flip-flop 148 remains reset so that the control signal is not returned to the midband configuration. This is prevented by the temporary memory provided by resistor 150 and capacitor 154 on the output of NOR gate 122, as the output of the gate is at the low logic level when the HOLD command is being produced (the Q output of flip-flop 120 is high).

If the engineer moves the throttle in the lead engine to notch 1, the automatic system is deactivated and the consist is under manual control. Without moving the throttle to position 1, the engineer may also regain manual control by pressing the restore power push button 26 as previously discussed.

Having thus described the invention, what is claimed as new and desired to be secured by Letters Patent is:

1. Apparatus for automatically controlling the speed of a consist of locomotives having a lead engine and a plurality of trailing engines, where each engine has a predetermined, efficient high throttle position and a desired low throttle position, said apparatus comprising:
   a plurality of control units including a lead unit for said lead engine and at least a first trail unit and a second trail unit for controlling the throttles of corresponding first and second trailing engines,
   an electrical control line extending from said lead unit to said trail units in serial order,
   said lead unit having means for sensing the speed of the consist, operator-activated means for selecting a desired operating speed for the consist, and means responsive to activation thereof for generating a cutout control signal and transmitting the same to said trail units along said control line, said control signal having a magnitude that changes in one direction as the actual speed of the consist rises above said desired operating speed, and that changes in the opposite direction as the speed of the consist falls below said desired operating speed,
   each of said trail units having a decoder responsive to the magnitude of said control signal for setting the respective engine throttle at either the high position to put the engine on line or the low position to cut it out,
   said trail units being provided with means responsive to said control signal for changing the magnitude thereof in said one direction by an amount equal to a predetermined speed increase as said control signal is conducted rearwardly in the consist from each trail unit to the next succeeding trail unit, whereby engines are successively throttled back from the rear of the consist and returned on line from the front to maintain the consist at said desired operating speed.

2. The apparatus as claimed in claim 1, wherein said magnitude is a voltage that changes in said directions with deviations in the speed of the consist from said desired operating speed, and wherein said magnitude changing means comprises a voltage-responsive network in each of said trail units for causing the received control signal to drop in voltage by said amount, said control line connecting the networks of said trail units in series to provide said voltage drop from unit to unit.

3. The apparatus as claimed in claim 1, wherein said control signal generating means provides the control signal with a characteristic that establishes a predetermined speed difference between the speed at which each trailing engine is cut out and the speed at which it is returned on line, and wherein the decoder of each of said trail units has means responsive to said characteristic for changing the throttle setting to said high or low position.

4. The apparatus as claimed in claim 1, wherein said control signal generating means has circuitry for providing said control signal with an identifier pulse portion that indicates that a received signal at said trail units is a valid control signal, and wherein the decoder of each of said trail units has means responsive to the absence of said identifier pulse for disabling the decoder to prevent cutout of the engine.

5. The apparatus as claimed in claim 1, wherein said control signal generating means provides the control signal with first and second control levels of different magnitudes that change in said directions with deviations in the speed of the consist from said desired operating speed, and wherein the decoder of each of said trail units has means for detecting said levels and for changing the throttle setting when both of said levels are either above or below a predetermined value, whereby a predetermined speed difference exists between the speed at which an engine is cut out and the speed at which it is returned on line.

6. The apparatus as claimed in claim 5, wherein the difference between the magnitudes of said first and second control levels is fixed at a value representing said predetermined speed difference.

7. The apparatus as claimed in claim 5, wherein said control signal generating means has circuitry for providing said control signal with an identifier pulse portion of greater magnitude than said control levels, and wherein the decoder of each of said trail units has a threshold detector responsive to said identifier pulse portion for conditioning the decoder for the reception and processing of valid control signals, and for disabling the decoder in the absence of said identifier pulse to prevent cutout of the engine.

8. The apparatus as claimed in claim 5, wherein said first and second control levels are voltages that differ by a fixed value when both are above zero, said value representing said predetermined speed difference, and wherein said magnitude changing means comprises a voltage-responsive network in each of said trail units for causing the received control signal to drop in voltage by said amount, said control line connecting the networks of said trail units in series to provide said voltage drop from unit to unit.

9. The apparatus as claimed in claim 1, wherein said operator-activated speed selecting means includes a speed memory for remembering the existing speed of the consist at the time of activation, whereby to store said desired operating speed.

10. The apparatus as claimed in claim 1, wherein said control signal generating means includes a speed comparator having inputs coupled with said speed sensing means and said operator-activated speed selecting means and an output from which a speed error signal is obtained, a speed error digitizer responsive to said speed error signal and having counter means in which the speed error signal is represented digitally, and output circuitry for delivering said control signal and providing the same with said magnitude in accordance with the digital value contained in said counter means.

11. The apparatus as claimed in claim 10, wherein said lead unit is provided with means responsive to predetermined operating conditions of the consist for producing a hold command that initiates a hold mode in which the control signal does not change in accordance with the speed error signal, said digitizer having means responsive to said hold command for preventing said counter means for responding to said speed error signal, whereby the digital value therein is held without change.

12. The apparatus as claimed in claim 11, wherein said lead engine has brakes under the control of the operator and a number of intermediate throttle positions between said high and low positions, and wherein said lead unit is provided with means responsive to the application of the brakes or movement of the lead engine throttle to certain of said intermediate positions for producing a hold command that initiates a hold mode in which the control signal does not change in accordance with the speed error signal, said digitizer having means responsive to said hold command for preventing said counter means from responding to said speed error signal, whereby the digital value therein is held without change.

13. The apparatus as claimed in claim 11 or 12, wherein said lead unit is further provided with a second operator-activated means for terminating said hold command to resume automatic speed control.

14. The apparatus as claimed in claim 10, wherein said operator-activated speed selecting means includes a speed memory having a counter provided with outputs capable of digitally representing said desired operating speed, digital-to-analog converter means connecting said counter outputs to a corresponding input of said speed comparator, and operator controlled means for producing an enable command to activate said counter and initiate counting operation thereof, there being control means responsive to said speed error signal for stopping the speed memory counter when the speed error signal reaches a predetermined level.

15. The apparatus as claimed in claim 10, wherein said lead unit is provided with means responsive to predetermined operating conditions of the consist for producing a hold command that initiates a hold mode in which the control signal does not change in accordance with the speed error signal, and wherein said digitizer has means responsive to said hold command for preventing said counter means from responding to said speed error signal, whereby the digital value therein is held without change, and further has means responsive to selection of said desired operating speed when said hold command is not being produced for causing said counter means to count to a predetermined digital value that establishes said magnitude of the control signal at a predetermined midband condition.

16. A method for automatically controlling the speed of a consist of locomotives having a lead engine and a plurality of trailing engines, where each engine has a predetermined, efficient high throttle position and a desired low throttle position, and where the trailing engines for control purposes are numerically designated in sequence beginning with the first trailing engine immediately behind the lead engine, said method comprising the steps of:

selecting a desired operating speed for the consist;

generating a cutout control signal in said lead engine and transmitting the control signal to the trailing engines in serial order;

providing said control signal with a characteristic that changes as the actual speed of the consist rises above and falls below said desired operating speed;

modifying said characteristic of the control signal as it is transmitted from the first trailing engine to successive trailing engines, in a manner such that the control signal at each trailing engine in succession represents a predetermined speed increase; and decoding said control signal at each trailing engine and setting the throttle thereof at either the high position to put the engine on line or the low position to cut it out, whereby engines are successively throttled back from the rear of the consist and returned on line from the front to maintain the consist at said desired operating speed.

17. The method as claimed in claim 16, wherein said characteristic is a magnitude of said control signal that changes in one direction as the actual speed of the consist rises above said desired operating speed, and that changes in the opposite direction as the speed of the consist falls below said desired operating speed, and wherein the step of modifying said control signal is effected by changing the magnitude thereof in said one direction by an amount equal to said predetermined speed increase as the control signal is transmitted rearwardly in the consist from engine to engine.

18. The method as claimed in claim 16, wherein is provided the additional step of establishing a predetermined speed difference between the speed at which each trailing engine is cut out and the speed at which it is returned on line.

19. Apparatus for automatically controlling the speed of a consist of locomotives having a lead engine and a plurality of trailing engines, where each engine has a predetermined, efficient high throttle position and a desired low throttle position, said apparatus comprising:

a plurality of control units for respective lead and trailing engines for controlling the throttles of the trailing engines, each of said units having means for sensing the speed of the consist, operator-activated means for selecting a desired operating speed for the consist, and means responsive to activation thereof for generating a cutout control signal having a characteristic that changes as the actual speed of the consist deviates from said desired operating speed, each of said units further having a pair of lines interconnected at a junction point and adapted for connection to corresponding trainline wires extending from said lines to the short and long hood trainline connectors respectively of the locomotive, an output lead connecting said control signal generating means with said junction point for transmitting said control signal thereto, and a decoder connected with said junction point and responsive to said control signal characteristic for setting the respective engine throttle at either the high position to put the engine on line or the low position to cut it out, each unit having means for rendering said control signal generating means operable when the unit is in the lead engine, whereby such lead unit is capable of generating said control signal and transmitting the same to the junction point therein for transmission to units in trailing engines, and means isolating said output lead from said junction point to prevent control signal conduction along said output lead away from said junction point, each unit being provided with means for disabling the decoder thereof when the unit is in the lead engine, whereby locomotives equipped with said control units may be employed as lead or trailing engines and the control units will respond without being especially set up for a lead unit or trailing unit function.

20. The apparatus as claimed in claim 19, wherein said characteristic is a magnitude of said control signal that changes in one direction as the actual speed of the consist rises above said desired operating speed, and that changes in the opposite direction as the speed of the consist falls below said desired operating speed, and wherein each of said lines of each unit has means therein causing said magnitude to change in said one direction by an amount equal to a predetermined speed increase as the control signal is conducted by the line away from said junction point, whereby engines are successively throttled back from the rear of the consist and returned on line from the front to maintain the consist at said desired operating speed.

* * * * *